United States Patent [19]

Farr

[11] 4,313,526
[45] Feb. 2, 1982

[54] DISC BRAKE CALIPER HAVING A SLIDING CYLINDER

[75] Inventor: Glyn P. R. Farr, Warwich, England

[73] Assignee: Lucas Industries Limited, Birmingham, England

[21] Appl. No.: 112,361

[22] Filed: Jan. 15, 1980

[30] Foreign Application Priority Data

Jan. 18, 1979 [GB] United Kingdom ............... 01915/79

[51] Int. Cl.³ ............................................. F16D 55/224
[52] U.S. Cl. ................. 188/72.4; 188/73.35; 188/73.45
[58] Field of Search ............... 188/72.4, 73.3, 73.4, 188/73.5, 370

[56] References Cited

U.S. PATENT DOCUMENTS

| | | | |
|---|---|---|---|
| 3,199,635 | 8/1965 | Bessler et al. | 188/73.3 |
| 3,363,727 | 1/1968 | Thirion | 188/73.4 |
| 3,625,314 | 12/1971 | Rinker | 188/73.5 |
| 3,935,928 | 2/1976 | Margetts | 188/73.4 |
| 4,055,237 | 10/1977 | Numazawa et al. | 188/73.5 |
| 4,121,698 | 10/1978 | Baum | 188/73.3 |
| 4,170,926 | 10/1979 | Emmett | 188/370 |

FOREIGN PATENT DOCUMENTS

| | | | |
|---|---|---|---|
| 284115 | 8/1966 | Australia | 188/72.4 |
| 1309068 | 3/1973 | United Kingdom | 188/73.4 |

Primary Examiner—Edward R. Kazenske
Attorney, Agent, or Firm—Scrivener, Clarke, Scrivener and Johnson

[57] ABSTRACT

A disc brake (1) comprises a cylinder (5) slidably mounted on a carrier member (2) for movement parallel to the axis of rotation of the disc. The cylinder (5) is closed at the end adjacent the disc. A bridge member (10) of integral structure, for example forged steel, connects the piston (7) to the outboard brake pad (15). In use, when hydraulic fluid is supplied to the cylinder (5) the cylinder slides on the carrier to apply the inboard brake pad (14) to the disc, and the piston applies a force to the outboard pad (15) via the bridge member (10). The seals (8,9) between the piston (7) and cylinder (5) are isolated from the heat produced by the brake pads, and the bridge member (10) does not require accurate machining and can be designed to provide the maximum strength.

4 Claims, 5 Drawing Figures

DISC BRAKE CALIPER HAVING A SLIDING CYLINDER

This invention relates to disc brakes, and more particularly to disc brakes in which the brake applying force is generated on one side only of the disc and serves to apply the disc pad located on the other side of the disc indirectly via a bridge member.

In a known disc brake a generally inverted U-shaped bridge member or caliper is formed by casting and is machined to provide the cylinder of a piston-and-cylinder hydraulic actuator. The cylinder is open towards the disc and houses a piston which acts directly on a brake pad located on one side of the disc. The bridge member is slidably mounted on a carrier for movement parallel to the axis of rotation of the disc such that when one pad is applied against the disc by the piston the reaction force causes the carrier to move and apply the other pad to the disc.

Whilst such brakes have been found to operate satisfactorily, they do have several disadvantages. Firstly, because of the size of the bridge member it must be formed by casting molten metal and must subsequently be machined to provide the necessary cylinder. Such fabrication is time consuming and expensive. Secondly, in order to provide access for machining the cylinder it is necessary to form the bridge either in two parts or to form the bridge with a hole or recess in the limb opposite the cylinder in order to provide access for the cylinder machining tool. If the bridge is fabricated from two parts high-tensile bolts must be used to hold the bridge assembled and this adds to the cost of manufacture. If a hole or recess is provided in the limb opposite the cylinder to permit access for machining, the strength of the limb opposite the cylinder is reduced. Thirdly, because the cylinder is open towards the disc any dust seal provided between the piston and the cylinder, and to a slightly lesser extent the fluid seal between the piston and cylinder, is exposed to heat generated during braking. This can lead to deterioration and eventual failure of the seals.

According to one feature of the present invention there is provided a disc brake comprising: a carrier member which, in use, is mounted in a fixed position adjacent a rotating brake disc; a piston and cylinder actuator, the cylinder of which extends parallel to the axis of rotation of the disc and is closed at the end adjacent the disc by an end wall, the cylinder being slidably mounted on the carrier member for movement parallel to the axis of rotation of the disc; a generally inverted U-shaped bridge member the limbs of which extend on opposite sides of the disc with one limb releasably secured to the piston of the actuator; and first and second brake pads located on opposite sides of the disc and acted upon respectively by the cylinder of the actuator and the bridge member, the arrangement being such that upon application of the brake, movement of the piston relative to the cylinder causes the bridge member to apply the second brake pad to its side of the disc whilst the reaction force on the cylinder causes the cylinder to move towards the disc to apply the first brake pad to its side of the disc.

An embodiment of the invention overcomes the disadvantages of the prior art described above. Because the bridge member is releasably secured to the piston, and is not integral with any components of the piston-and-cylinder, it need not be accurately machined and can be fabricated by forging or pressing rather than by molten metal casting. Because it is not necessary to provide access for machining a cylinder integral with the bridge member the bridge member can be of a relatively simple shape and strong construction. The cylinder is open at the ends remote from the disc and accordingly any dust seals provided between the piston and cylinder together with the fluid seal between the piston and cylinder are shielded from the heat produced at the disc during braking.

The above and further features and advantages of the invention will become clear from the following description of an embodiment thereof, given by way of example only, reference being had to the accompanying drawings wherein.

Figure 1:
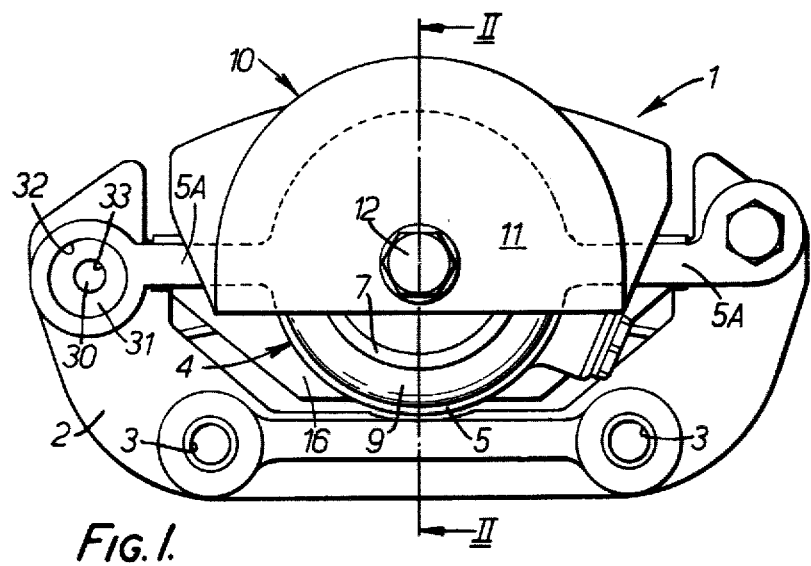
FIG. 1 is an elevational view of a disc brake.

Referring to FIGS. 1–4 the disc brake 1 comprises a carrier member 2 having mounting holes 3 by means of which the carrier is mounted, in use, in a fixed position adjacent a brake disc (not shown).

A piston-and-cylinder actuator 4 comprises a cylinder 5 provided with arms 5A by means of which the cylinder is mounted for sliding movement on the carrier member as described in more detail hereinafter. The direction of relative movement of the cylinder 5 and the carrier member 2 is parallel to the axis of rotation of the disc, i.e. perpendicular to the plane of the paper of FIG. 1. The cylinder 5 is closed at the end thereof adjacent the disc by an end wall 6. The other end of the cylinder is open and the piston 7 of the actuator extends through this open end. A fluid seal 8 is provided between the piston 7 and cylinder 5 and a dust seal 9 is provided to protect the surface of the piston from road dirt and moisture.

A generally inverted U-shaped bridge member 10 has one limb 11 secured to the piston 7 by a bolt 12. The other limb 13 of the bridge member extends parallel to the first limb 11 but on the other side of the disc. The bridge member 10 is formed by any suitable process, for example forging, and is of any suitable material, for example steel.

First and second brake pads 14,15 are mounted on the carrier member for sliding movement relatively towards each other (i.e. towards the disc) and away from each other (i.e. away from the disc). To this end, the pads 14,15 include backing plates 16,17 which slide on shoulders provided on the carrier member. Torque or drag forces imposed on the pads during braking are transferred by the backing plates 16,17 directly to the carrier member 2 so that no drag forces are applied to the bridge member 10.

In order to prevent rattling of the pad 14 an anti-rattle spring 18 may be provided on the backing plate 16 to engage the central portion of the bridge member 10. In order to prevent rattling of the pad 15 and to locate the bridge member 10 a spring 19 is secured to the limb 13 of the bridge member by a screw 20. The spring 19 engages under shoulders 21 provided on the carrier member to bias the bridge member downwardly as viewed in FIGS. 1,2 and 4. The bridge accordingly bears on the backing plate 17 of pad 15 and biases the pad downwardly into engagement with the carrier member.

Sliding movement of the cylinder 5 on the carrier member can be provided by any suitable means. In the arrangement shown in FIG. 3 a pin 22 is secured to arm 5A and is slidably received in a bore 23 in the carrier member. Three equi-spaced grooves 24 are formed in the surface on the pin 22 to allow lubricant contained in the bore 23 to lubricate sliding movement. The ingress of dirt and moisture is prevented by a rubber gaiter 25. In the alternative arrangement shown in FIG. 5, a pin 26 is secured to the carrier member 2 and is slidably received in a bore 27 formed in the arm 5A. Again, gaiters 28,29 prevent the ingress of dirt and moisture to the sliding surfaces.

In use, when the disc brake is applied, hydraulic fluid is supplied to the cylinder 5 forcing the piston 7 outwardly of the cylinder. The piston 7 acts on the bridge member 10 to move the pad 15 into engagement with one side of the disc. The reaction force produced on the cylinder 6 causes the cylinder to slide relative to the carrier member 2 and apply the pad 14 against the disc.

It will be noted that during braking the seals 8 and 9 are well spaced from the disc, and accordingly are not subjected directly to the heat created at the disc.

As the pads 14,15 wear it will be observed that the cylinder 5 moves towards the disc and accordingly the sliding connection between the cylinder and the carrier is retracted. In the case of the embodiment of FIGS. 1-4 the pin 22 moves into the bore 23 and the gaiter 25 collapses. In the case of the embodiment of FIG. 5 the journal at the end of arm 5A moves along the pin 26 towards the base of the pin. Accordingly, brake pad wear tends to reduce the required installation space. This contrasts with the prior art disc brake described above in which the cylinder is integral with the bridge member in which the sliding connection between the bridge member and the carrier member is extended rather than retracted as a result of pad wear, thus increasing the required installation space.

Figure 2:
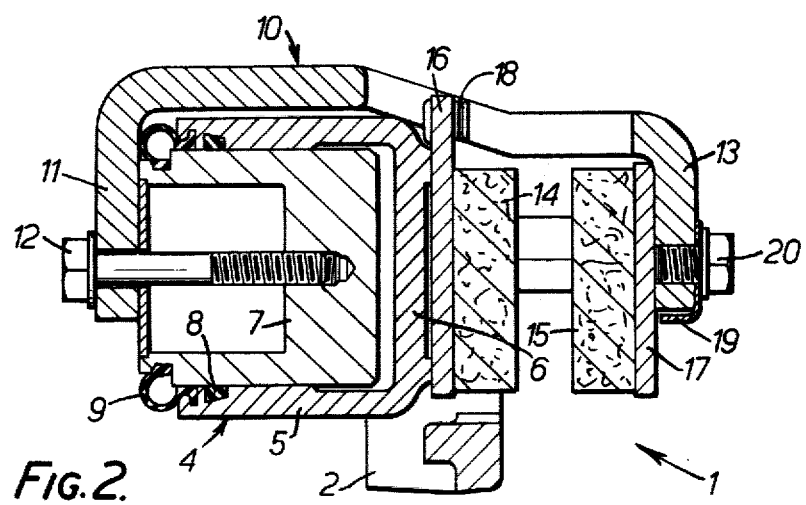
FIG. 2 is a cross sectional view on the line II—II of FIG. 1.
Figure 3:
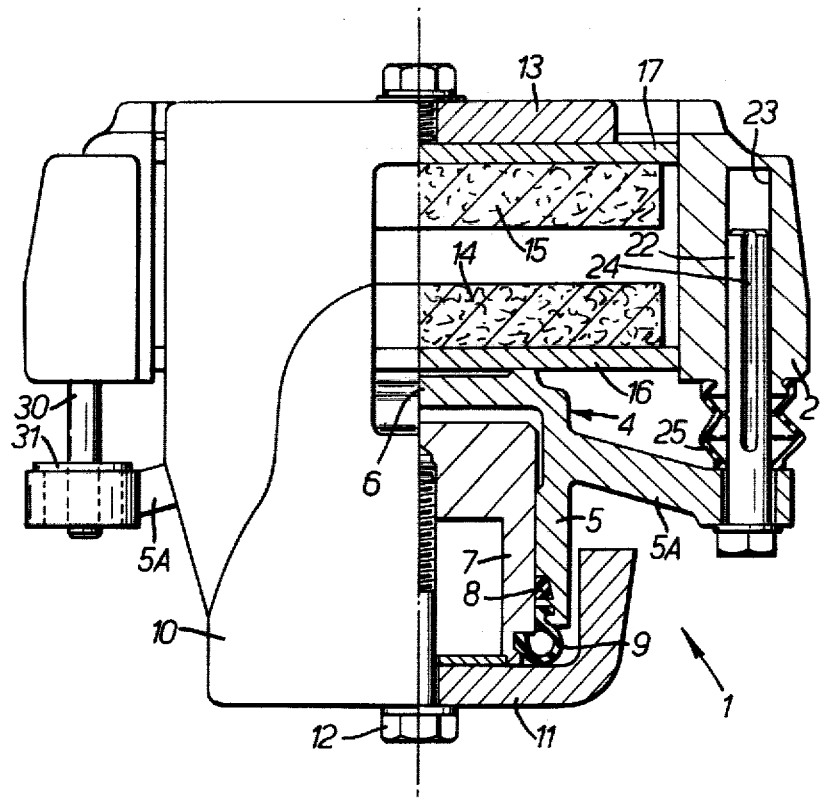
FIG. 3 is a plan view, partly in section, of the disc brake of FIG. 1.
Figure 4:
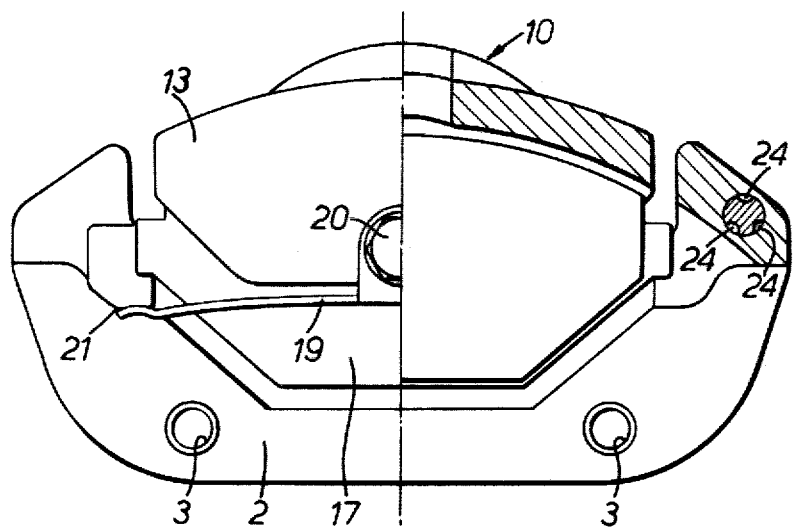
FIG. 4 is a rear elevational view, partly in section, of the disc brake of FIG. 1.
Figure 5:
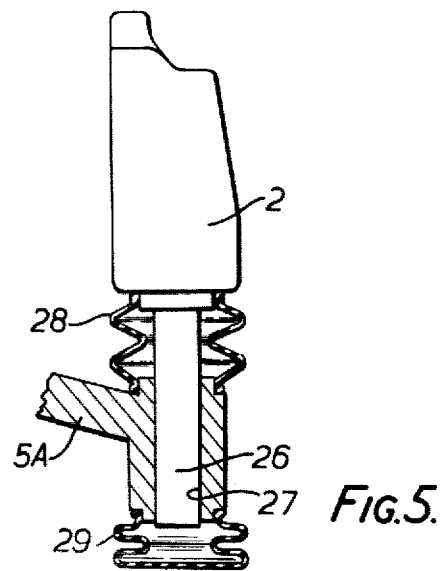
FIG. 5 shows a modification of the disc brake of FIGS. 1–4.

No matter whether the pin arrangement shown in FIGS. 1-4 or the pin arrangement of FIG. 5 is used for one of the pin sliding connections by which the cylinder 5 is mounted on the carrier member 2, the other pin sliding connection is preferably as shown in FIGS. 1-3 and comprises a pin 30 which is rigidly secured to the carrier member 2 and slides in a bush 31 located within a cylindrical mounting passage formed in the end of the arm 5A. The bush 31 is preferably formed of plastics material, for example nylon and the bore 33 thereof within which the pin 30 slides is eccentric relative to the bore 32. By rotating the bush 31 by hand during assembly of the disc brake the bore 33 can be aligned with the pin 30 regardless of any eccentricity of the pin 30 relative to the bore 32 caused by manufacturing tolerances.

When the pads of the above described disc brake have become fully worn the screw 20 and bolt 12 are removed and the bridge member 10 is lifted clear of the carrier member leaving the actuator 4 and its associated hydraulic connections in place on the carrier member. The pads are replaced and the actuator is returned to its initial configuration by pushing the piston 7 back into the cylinder 5 and sliding the cylinder 5 away from the disc to accommodate the new brake pads. The bridge member 10 is then replaced and the bolt 12 and screw 20 re-fitted to secure the bridge in position. It will be observed that changing the pads is accordingly a straight-forward operation and does not involve disturbing the actuator. Similarly, servicing of the actuator to replace the seals 8,9 is simple since after the bridge 10 has been removed as described above the open end of the cylinder is accessible permitting removal of the piston 7.

It will be noted that the bridge member 10 is not integral with any components which require close tolerance machining. Accordingly, the bridge member 10 can be formed by any convenient process and can be designed to provide maximum strength without the constraints imposed by the requirements for accurate machining after basic shaping. This enables the bridge to be formed of forged steel or, if light weight is desirable, of a light-weight material, e.g. cast aluminum alloy. Further, it will be noted that the bolt 12 and screw 20 merely serve to locate the bridge member and secure the bridge member in position. All actuating stresses transmitted by the bridge member are transmitted by the body of the bridge member and not by the bolt 12 or screw 20. Accordingly the bolt 12 and screw 20 can be of relatively light construction and need not be made of high-tensile materials.

It will further be appreciated that because the piston is isolated from much of the heat produced during braking it can either be of conventional metal construction or can be formed from suitable plastics material. The use of a plastics piston and use of light-weight alloys for many metal parts of the brake enables a brake of low overall weight to be produced.

I claim:
1. In a disc brake assembly comprising:
 (a) a carrier member adapted to be mounted in a fixed position adjacent a brake disc and including portions spanning the periphery of the brake disc;
 (b) a hydraulic cylinder slidably mounted on the carrier member on one side of the brake disc, the cylinder being closed at the end thereof adjacent the brake disc by an end wall;
 (c) a piston slidably mounted in the cyliner;
 (d) a first brake pad slidably mounted on the carrier member between the disc and said end wall of said cylinder;
 (e) a second brake pad slidably mounted on the carrier member on the opposite side of the disc to the first brake pad; and
 (f) a bridge member for transmitting actuating force from said piston to said second brake pad the improvement comprising said bridge member being an integral unitary member of generally U-shaped transverse cross-section with the central portion of said U-shape overlying said brake pads, the bridge member being retained in operative position solely by first releasable fastener means securing the bridge member to the piston and by a spring secured to the bridge member adjacent said second brake pad and slidably engaging radially inwardly directed surfaces of said carrier member.

2. A disc brake assembly according to claim 1 wherein said brake pads are slidably mounted on radially outwardly directed surfaces of said carrier member and said spring causes said bridge member to engage at least the second brake pad to force same into engagement with said radially outwardly directed surfaces.

3. Addisc brake assembly according to claim 1 or claim 2 wherein said spring is secured to the bridge member by second releasable fastener means whereby release of said first and second releasable fastener means permits removal of said bridge member from said disc brake assembly.

4. A disc brake assembly according to claims 1 or 2 wherein the cylinder is mounted on the carrier member by means of sliding pin connections each of which comprises a pin secured to and cantilevered from one of the carrier member and the cylinder and slidable into a supporting socket provided on the other of the carrier member and the cylinder as the brake pads wear.

* * * * *